Feb. 24, 1953     J. E. O'HERRON     2,629,157
FASTENER
Filed April 11, 1950
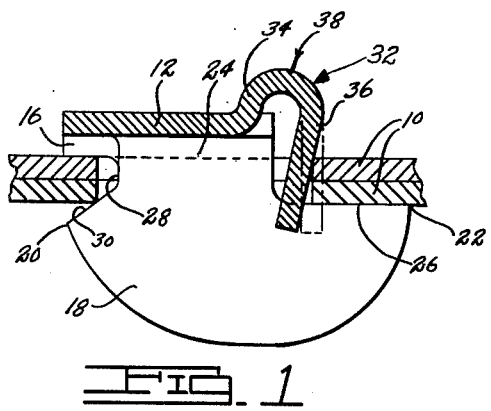
FIG. 1
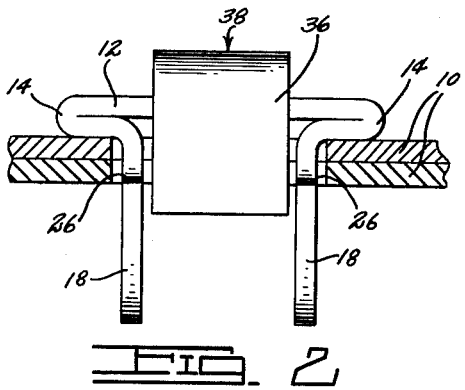
FIG. 2
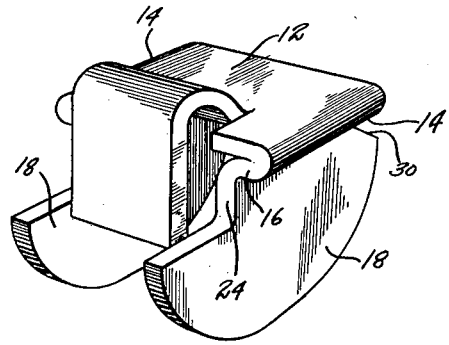
FIG. 3
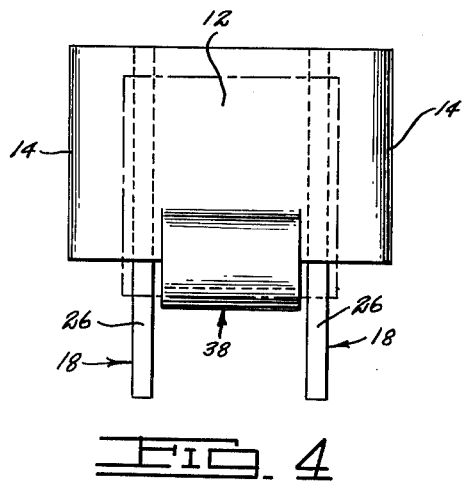
FIG. 4
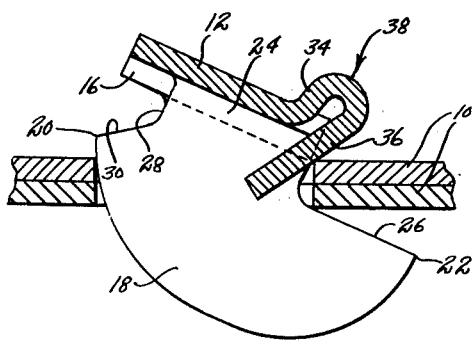
FIG. 5
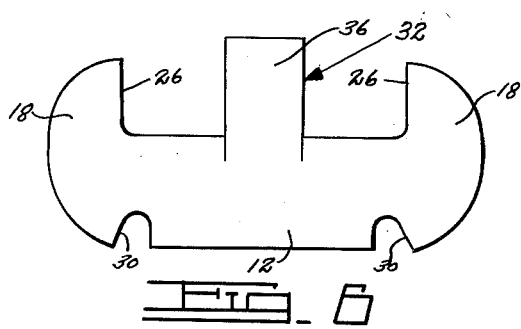
FIG. 6
INVENTOR.
JOHN E. O'HERRON
BY
ATTORNEY Patented Feb. 24, 1953

2,629,157

UNITED STATES PATENT OFFICE 2,629,157

FASTENER

John E. O'Herron, Detroit, Mich.

Application April 11, 1950, Serial No. 155,300

3 Claims. (Cl. 24—213)

This invention relates to a fastener and more particularly to a fastener of the snap on type for securing two members together, either two panels or a part to be secured to a support.

The fastener is formed from sheet metal material, blanked and formed to desired shape for insertion through an opening in overlapping parts.

It is an object of the present invention to provide a fastener having a head portion for engagement with one side of overlapping parts, a surface engaging portion which may be inserted through the parts for engagement with the opposite sides of the parts, and resilient means co-operating with the edge of an opening through the overlapping parts for urging the fastener laterally into holding position.

Another object of the invention is to provide a fastener which may be stamped from sheet metal and readily applied to the parts by manual pressure, the securing means being rigidly connected to the body portion and resilient means for urging the rigid securing means to holding position.

Other objects and advantages of the invention will more fully appear from the following description taken in connection with the accompanying drawings in which:

Fig. 1 is a cross sectional view through the fastener and overlapping members, showing the fastener in its applied position;

Fig. 2 is an end elevational view of the fastener with the overlapping parts shown in cross section;

Fig. 3 is a perspective view of the fastener;

Fig. 4 is a top plan view of the fastener;

Fig. 5 is a view corresponding to Fig. 1 but showing the fastener in position before final assembly; and Fig. 6 is a top plan view of the sheet material showing the blank before it is formed to shape.

I have illustrated the fastener as applied to overlapping sheets 10 for securing the sheets together, but the fastener may be used for securing any part to a support wherein it is desired to secure one member to another by insertion of the fastener through an opening or between flanges of the parts.

The fastener comprises a head section 12 adapted to lie substantially in a plane parallel to the plane of the sheet material and over the upper surface thereof. The opposite lateral edges of the head 12 are reversely bent, as at 13, upon themselves toward the center of the head forming thickened lateral flanges 14. The inner ends of the reversely bent portions 16 are bent downwardly at right angles to the plane of the head 12 forming spaced parallel legs 18. Each leg 18 is in a flat plane and the outer lower edge thereof is curved. One end 20 of each leg terminates substantially flush with one end of the head 12 and the opposite end 22 of the legs projects beyond the opposite end of the head 12. A neck portion 24 of each leg spaces the projecting end 22 from the plane of the head 12 with the upper surface of the projecting portion in a plane substantially parallel to the plane of the head. The distance between the upper surface of the projecting portion 22 from the under surface of the reversely bent portion 16 of flange 14 is a distance substantially equal to the thickness of the two sheets 10 so that the upper edge 26 of the projecting portion 22 rests against the under surface of the sheets and the under surface of the flanges 14 rest on the upper surface of the sheets when assembled.

The opposite ends 20 of the legs 18 and neck 24 form a notch 28. The lower surface of the reversely bent portion 16 forms one side of the notch and the slanting upper edges 30 form the other side of the notch.

An outwardly extending tab 32 on the end of the head 12, adjacent the projections 22, is first bent upwardly as at 34 and then downwardly as at 36 forming a U-shaped resilient portion 38, with the base of the U extending upwardly above the plane of the head 12, the leg 36 projecting downwardly below the plane of the head 12 and between the spaced legs 18. The leg 36 is resiliently movable relative to the head 12.

When the fastener is assembled, the projecting ends 22 of the legs 18 are inserted in the openings of the sheets 10 until the resilient leg 36 strikes the edge of the opening. At this point the outer curved surface of the legs 18 rest on the opposite edge of the opening. Pressure on the head 12 causes the curved surface of the lower edge 26, the surface being as a cam about a center at the juncture of the neck 24 and surface 26, to force the fastener to the right against the spring resistance of the U-shaped resilient portion 38 forcing the leg 36 inwardly whereby the edge 20 passes through the openings in the sheets. The spring tension of the leg 36 then forces the fastener to the left where the edges of the sheets are received in the notch 28. The tapered surface 30 and the edge surface 26 are then rigidly positioned against the under surface of the sheets and the flanges 14 are drawn by the tapered surface 30 and co-acting resilient arm 36 into close contact with the upper surface of the sheets. This action draws the sheets together in secured holding position.

I have herein illustrated and described a preferred embodiment of the invention, but it will be understood that various changes, including the size, shape and arrangement of parts, may be made without departing from the spirit of my invention and it is not my intention to limit its scope other than by the terms of the appended claims.

I claim:

1. A sheet metal fastener comprising a head portion, a pair of outwardly extending flanges carried by said head formed by reversely bending the metal upon itself, the reversely bent portions terminating in spaced downwardly extending legs substantially normal to said head, one edge of said legs being provided with a cam surface and having a notch between said flanges and said legs, the opposite end edge of said legs projecting beyond said head and flanges, and a resilient leg depending from said head at the outwardly projecting legs end and between said legs.

2. A sheet metal fastener comprising a head portion, a pair of flat legs depending from said head and spaced apart and inwardly of opposite edges of said head, and a resilient leg depending from said head between said legs, said flat legs having a notch at one end thereof formed by a projection of said flat legs spaced downwardly from the plane of said head at one end thereof and opposite to the end portion carrying said resilient leg, and the opposite ends of said flat legs extending outwardly beyond the edge of said body portion and beyond said resilient leg.

3. A sheet metal fastener comprising a head portion, a pair of flat legs depending from said head portion and spaced apart, outwardly projecting flanges at opposite sides of said head portion extending outwardly beyond said spaced legs, a notch between one edge of said legs and said flanges, the opposite edges of said legs extending outwardly beyond the opposite end of said flanges and said head, and a resilient leg projecting downwardly below said head and between said flat legs at the end of said head portion opposite to the notch.

JOHN E. O'HERRON.

REFERENCES CITED

The following references are of record in the file of this patent:

UNITED STATES PATENTS

| Number | Name | Date |
| --- | --- | --- |
| 2,188,026 | Wiley | Jan. 23, 1940 |
| 2,258,788 | Meyer | Oct. 14, 1941 |
| 2,375,409 | Glitsch | May 8, 1945 |
| 2,391,298 | Davis | Dec. 18, 1945 |
| 2,428,338 | Poupitch | Sept. 30, 1947 |